(12) United States Patent
Kraus et al.

(10) Patent No.: US 12,555,243 B2
(45) Date of Patent: Feb. 17, 2026

(54) LABELING ANATOMICAL STRUCTURES IN MEDICAL IMAGING DATASETS

(71) Applicant: Siemens Healthineers AG, Forchheim (DE)

(72) Inventors: Martin Kraus, Fuerth (DE); Mehmet Akif Gulsun, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 354 days.

(21) Appl. No.: 18/181,004

(22) Filed: Mar. 9, 2023

(65) Prior Publication Data

US 2023/0289973 A1  Sep. 14, 2023

(30) Foreign Application Priority Data

Mar. 10, 2022  (EP) .................................... 22161374

(51) Int. Cl.
  *G06T 7/11*   (2017.01)
  *G06T 7/00*   (2017.01)

(52) U.S. Cl.
  CPC .............. *G06T 7/11* (2017.01); *G06T 7/0012* (2013.01); *G06T 2207/20081* (2013.01); *G06T 2207/30101* (2013.01)

(58) Field of Classification Search
  CPC .................. G06T 7/11; G06T 7/0012; G06T 2207/20081; G06T 2207/30101; G06T 7/143; G06T 7/16; G06T 2207/10081; G06T 2207/10088; G06T 2207/10104; G06T 2207/10116; G06T 2207/20076; G06T 2207/20084; G06T 2207/30048; G06V 10/765; G06V 20/70; G06V 2201/03; G06V 10/426; G06V 10/267; G06V 10/764; G06V 10/82; G16H 30/40; G16H 30/20; G06N 3/0464; G06N 3/08
  See application file for complete search history.

(56) References Cited

U.S. PATENT DOCUMENTS

| | | | | |
|---|---|---|---|---|
| 8,150,113 | B2 * | 4/2012 | Ray | G06T 7/12 |
| | | | | 128/923 |
| 10,949,977 | B2 * | 3/2021 | Wang | G06T 7/181 |
| 12,094,596 | B2 * | 9/2024 | Wang | G06N 3/08 |
| 12,112,470 | B2 * | 10/2024 | Georgescu | G06T 7/0012 |

(Continued)

FOREIGN PATENT DOCUMENTS

| | | | | | |
|---|---|---|---|---|---|
| CN | 104867147 | A | * | 8/2015 | G06T 7/00 |
| CN | 112541893 | A | * | 3/2021 | G06T 7/00 |

OTHER PUBLICATIONS

Wikipedia:"Tree_traversal", https //en wikipedia org/w/1ndex php?tltle=Tree_traversal&old1d=1074728540; XP93199447.

(Continued)

*Primary Examiner* — Tom Y Lu
(74) *Attorney, Agent, or Firm* — Harness, Dickey & Pierce, P.L.C.

(57) ABSTRACT

Various examples of the disclosure pertain to determining a label set for an anatomical structure such as a complex blood vessel, e.g., the coronary artery. The determining of the label set takes into account multiple inputs, such as the rule set of anatomical relationship between sub structures of the anatomical structure and a list of candidate labels and associated probabilities obtained for each one of the anatomical substructures.

20 Claims, 7 Drawing Sheets

(56) References Cited

U.S. PATENT DOCUMENTS

2016/0328850 A1* 11/2016 Yin .................. G16H 50/80
2023/0394654 A1* 12/2023 Hampe ............... A61B 6/504
2024/0331138 A1* 10/2024 Wang ................ A61B 5/4576

OTHER PUBLICATIONS

Gülsün M.A., et al.: "CTA Coronary Labeling through Efficient Geodesics between Trees Using Anatomy Priors". Medical Image Computing and Computer-Assisted Intervention—MICCAI 2014. MICCAI 2014. Lecture Notes in Computer Science, vol. 8674. Springer, Cham. https://doi.org/10.1007/978-3-319-10470-6_65.

Wang, Tsaipei: "Iterative data-driven coronary vessel labeling"; 2017 IEEE 27th International Workshop on Machine Learning for Signal Processing (MLSP); IEEE; Sep. 25, 2017; pp. 1-6; XP033263955; DOI: 10.1109/MLSP.2017.8168190.

Guanyu, Yang et al. "Automatic centerline extraction of coronary arteries in coronary computed tomographic angiography" The International Journal of Cardiovascular Imaging, 2011 // ISSN: 1569-5794, DOI:10.1007/s10554-0II-9894-2.

Kong B. et al.: "Learning tree-structured representation for 3D coronary artery segmentation." Computerized Medical Imaging and Graphics 80 (2020): 101688.

Kerkeni, Asma et al. "A coronary artery segmentation method based on multiscale analysis and region growing", in: Computerized Medical Imaging and Graphics 48, pp. 49-61, 2016.

Wang et al.Automatic labeling of vascular structures with topological constraints via HMM, DOI: 10.1007/978-3-319-66185-8_24.

Cao Qing et al: "A model-guided method for improving coronary artery tree extractions from CCTA images"; International Journal of Computer Assisted Radiology and Surgery, Springer, DE; vol. 14, No. 2; Nov. 28, 2018; pp. 373-383; XP037012536; ISSN: 1861-6410; DOI: 10.1007/S11548-018-1891-7.

Zhou, Chen : "A Hybrid Approach for Coronary Artery Anatomical Labeling in Cardiac CT Angiography A Hybrid Approach for Coronary Artery Anatomical Labeling in Cardiac CT Angiography"; J. Phys.: Conf. Ser. Journal of Physics: Conference Series; Jan. 1, 2020; XP055944256; Retrieved from the Internet: URL:https://iopscience.iop.org/article/10.1088/1742-6596/1642/1/012020/pdf.

* cited by examiner

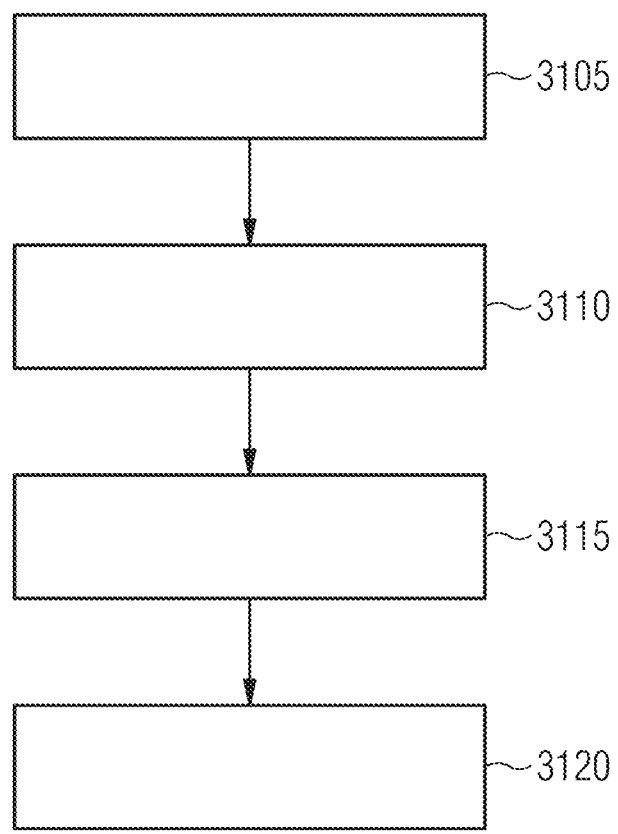

LABELING ANATOMICAL STRUCTURES IN MEDICAL IMAGING DATASETS

CROSS-REFERENCE TO RELATED APPLICATION(S)

The present application claims priority under 35 U.S.C. § 119 to European Patent Application No. 22161374.8, filed Mar. 10, 2022, the entire contents of which are incorporated herein by reference.

FIELD

Various examples of the disclosure generally relate to determining a label set including multiple labels for labeling an anatomical structure in a medical imaging dataset.

BACKGROUND

Medical imaging datasets—e.g., acquired using Computed Tomography (CT), Magnetic Resonance Tomography (MRT) or X-ray imaging, to give just a few examples—can be analyzed using computer-implemented algorithms. Specifically, it is possible to detect and localize anatomical structures in the medical imaging datasets. A segmentation can be determined that delimits the anatomical structure. Further, once one or more anatomical structures have been detected in localized, it can be helpful to determine a label set. A label set includes one or more labels that provide a textual description of semantic context information of the anatomical structure. Thereby, analysis of the medical imaging dataset by a radiologist or another user can be facilitated.

Sometimes complex anatomical structures need to be labeled. Such complex anatomical structures can include multiple anatomical substructures. Such anatomical substructures can form parts of the greater anatomical structure. Specifically, it would be possible that the anatomical substructures are arranged in one or more spatial sequences, i.e., next to each other in a type of chain. An example would be arteries or blood vessels, e.g., the coronary artery, that include varies sections.

See, e.g., Gülsün, Mehmet A., et al. "CTA coronary labeling through efficient geodesics between trees using anatomy priors." International Conference on Medical Image Computing and Computer-Assisted Intervention. Springer, Cham, 2014. Yang, Guanyu, et al. "Automatic coronary artery tree labeling in coronary computed tomographic angiography datasets." 2011 Computing in Cardiology. IEEE, 2011. Also see Wang, Xingce, et al. "Automatic labeling of vascular structures with topological constraints via HMM." International Conference on Medical Image Computing and Computer-Assisted Intervention. Springer, Cham, 2017.

SUMMARY

The inventors have identified a need for advanced techniques of determining label sets for medical imaging datasets. More specifically, for example, the inventors have identified a need for advanced techniques for determining label sets including multiple labels for labeling complex anatomical structures, e.g., the coronary artery.

At least the above-mentioned need is met by one or more embodiments of the present invention.

A computer-implemented method of determining a label set is disclosed. The label set includes multiple labels for anatomical substructures of an anatomical structure. The anatomical structure is depicted by a medical imaging data set. The anatomical structure includes the multiple anatomical substructures arranged in multiple sequences. The multiple sequences of the anatomical substructures are joined at bifurcation points. The method includes obtaining a tree-structured segmentation of the anatomical structure in the medical imaging data set. The tree-structured segmentation includes multiple sequences of sections. The multiple sequences of sections are associated with the sequences of substructures of the anatomical structure. The method also includes obtaining, for each section of the tree-structured segmentation, a respective predetermined list of candidate labels and associated probabilities. Also, the method includes obtaining a ruleset of anatomical interrelationships between the substructures of the anatomical structure. The method further includes determining the label set by performing a selection for each section of the tree-structured segmentation, from the respective predetermined list of candidate labels. The selection pertains to a respective label. The selection is based on the associated probabilities and takes into account the rule set of anatomical interrelationships.

A computer program or a computer-program product or a computer-readable storage medium includes program code. The program code can be loaded and executed by at least one processor. Upon loading and executing the program code, the at least one processor performs a method of determining a label set. The label set includes multiple labels for anatomical substructures of an anatomical structure. The anatomical structure is depicted by a medical imaging data set. The anatomical structure includes the multiple anatomical substructures arranged in multiple sequences. The multiple sequences of the anatomical substructures are joined at bifurcation points. The method includes obtaining a tree-structured segmentation of the anatomical structure in the medical imaging data set. The tree-structured segmentation includes multiple sequences of sections. The multiple sequences of sections are associated with the sequences of substructures of the anatomical structure. The method also includes obtaining, for each section of the tree-structured segmentation, a respective predetermined list of candidate labels and associated probabilities. Also, the method includes obtaining a ruleset of anatomical interrelationships between the substructures of the anatomical structure. The method further includes determining the label set by performing a selection for each section of the tree-structured segmentation, from the respective predetermined list of candidate labels. The selection pertains to a respective label. The selection is based on the associated probabilities and takes into account the rule set of anatomical interrelationships.

A device comprising at least one processor and a memory is disclosed. The memory includes program code that can be executed by the at least one processor. Upon executing the program code, the at least one processor performs a method of determining a label set. The label set includes multiple labels for anatomical substructures of an anatomical structure. The anatomical structure is depicted by a medical imaging data set. The anatomical structure includes the multiple anatomical substructures arranged in multiple sequences. The multiple sequences of the anatomical substructures are joined at bifurcation points. The method includes obtaining a tree-structured segmentation of the anatomical structure in the medical imaging data set. The tree-structured segmentation includes multiple sequences of sections. The multiple sequences of sections are associated with the sequences of substructures of the anatomical structure. The method also includes obtaining, for each section of the tree-structured segmentation, a respective predetermined list of candidate labels and associated probabilities. Also, the method includes obtaining a ruleset of anatomical interrelationships between the substructures of the anatomical structure. The method further includes determining the label set by performing a selection for each section of the tree-structured segmentation, from the respective predetermined list of candidate labels. The selection pertains to a respective label. The selection is based on the associated probabilities and takes into account the rule set of anatomical interrelationships.

It is to be understood that the features mentioned above and those yet to be explained below may be used not only in the respective combinations indicated, but also in other combinations or in isolation without departing from the scope of the present invention.

BRIEF DESCRIPTION OF THE DRAWINGS

FIG. 9 is a flowchart of a method according to various examples.

DETAILED DESCRIPTION

Figure 1:
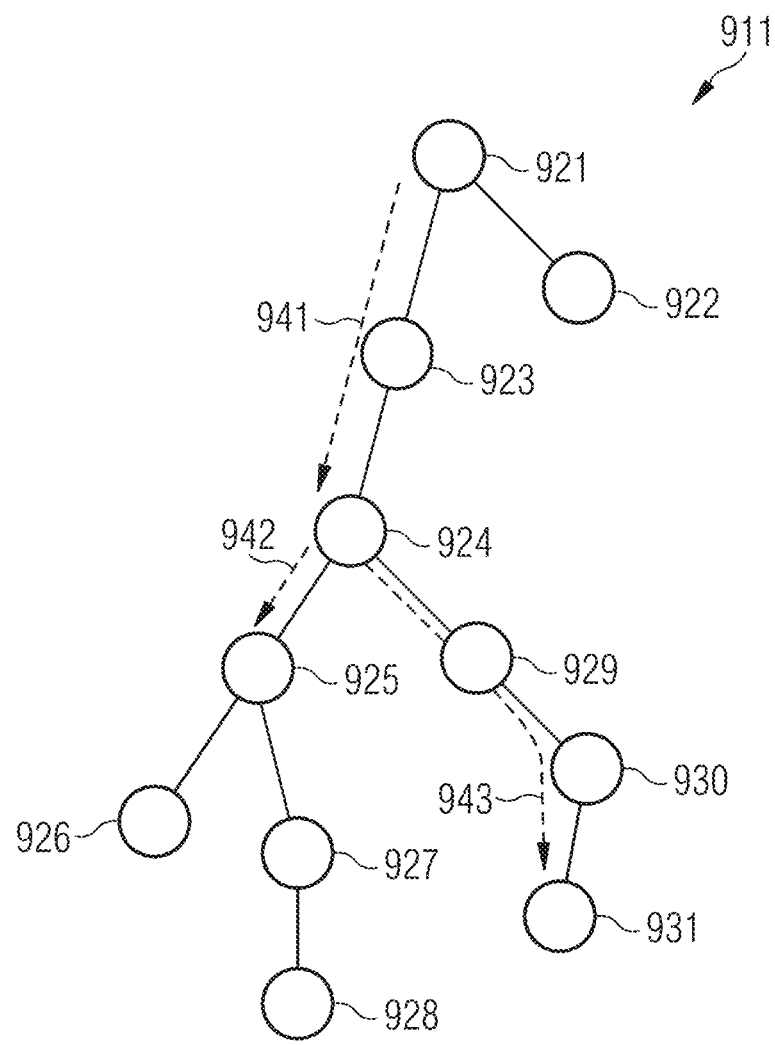
FIG. 1 schematically illustrates a tree-type data structure that could be used, e.g., to represent a tree-structured segmentation according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the present invention will be described in detail with reference to the accompanying drawings. It is to be understood that the following description of embodiments is not to be taken in a limiting sense. The scope of the present invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various examples disclosed herein pertain to postprocessing of medical imaging datasets.

For instance, medical imaging datasets could be acquired using CT, MRT, or X-ray imaging, to give just a few examples. Other imaging modalities are conceivable, e.g., Positron Emission Tomography or ultrasound imaging.

A medical imaging dataset can include one or more images, e.g., two-dimensional images. A medical imaging dataset can include volumetric three-dimensional data.

One or more algorithms to postprocessing medical imaging datasets can be used, e.g., to extract information. For instance, one or more anatomical structures may be detected and localized in the medical imaging dataset. Depending on the particular field of view, different types of anatomical structures can be detected and localized. For instance, for angiography, it would be possible that the coronary artery is subject to the postprocessing. For instance, where the brain is imaged, carotid arteries or vertebral arteries could subject to the postprocessing.

As a general rule, complex anatomical structures can be subject to the postprocessing. Such complex anatomical structures can include multiple substructures. These substructures may be arranged in a certain spatial relationship with each other. Specifically, it would be possible that the substructures are arranged in one or more sequences. This means that a spatial sequence or chain of substructures is formed, i.e., a given substructure can be connected to one or more other substructures. This would be typical for arteries, but other examples would be possible, e.g., muscle structures including tendons and muscles.

According to various examples, the complex anatomical structures can include multiple substructures forming multiple sequences. Two or more of the sequences can be joined at bifurcation points. For instance, an artery may bifurcate into two vessels at such a bifurcation point.

For instance, it is possible to represent such complex anatomical structures that include one or more sequences of substructures in a tree-type data structure.

As a general rule, a tree-type data structure can include a root node from which one or more segments extend to one or more child nodes. Some of these child nodes can implement bifurcations, i.e., some of these child nodes can include multiple respective child nodes.

FIG. 1 illustrates aspects with respect to an example tree-type data structure 911. The specific data structure 911 that is depicted in FIG. 1 is only one possible example and is used to illustrate concepts associated with tree-type data structures in general.

The tree-type data structure 911 includes multiple nodes 921-931.

Specifically, a root node 921 is illustrated. Multiple child nodes 922-931 of the root node are illustrated. Adjacent nodes can be referred to as parent node and child node, respectively. For instance, the node 929 would be the parent node with respect to the child node 930.

The nodes 924, 925, as well as the root node 921 are bifurcations.

The nodes 926, 928, 931, 922 are leaf nodes, i.e., form ends of respective sequences of nodes.

Nodes having a similar distance to the root node 921 or a bifurcation can be referred to as sibling nodes. For instance, the nodes 925 and 929 would be sibling nodes.

As will be appreciated, the nodes 921-931 forms sequences. One example sequence 941 is illustrated in FIG. 1. This sequence 941 extends from the root node 921 to the child node 924; the child node 924 implements a bifurcation such that two further sequences 942, 943 extend towards the leafs.

According to various examples, a segmentation of a medical imaging dataset can be obtained in the form of a tree-type data structure. I.e., the segmentation can include sections, i.e., parts of the segmented area, that are respectively associated with or implement nodes.

According to various examples, postprocessing of medical imaging datasets can include multiple tasks. Some tasks are summarized in TAB. 1 below.

TABLE 1

Various postprocessing tasks for postprocessing a medical imaging dataset.

| Task | | Example details |
|---|---|---|
| I | Segmentation | A first task can correspond to the detection and localization of one or more anatomical structures. For instance, it would be possible to determine a segmentation of the anatomical structure. To give an example, it would be possible to segment a centerline of a blood vessel, e.g., the coronary artery or other arteries. The segmentation can be provided as a tree-type data structure, i.e., including multiple sections that form sequences (cf. FIG. 1). |
| II | Classification | A second tasks can include classifying substructures of anatomical structures. A classification result can be associated with probabilities that a given substructure of the anatomical structure is of a given class. For instance, different classification results can be associated with different probabilities. For instance, for a given section of a tree-structure segmentation of an anatomical structure, this section being associated with a given anatomical substructure, it would be possible to obtain a list of possible classification results, wherein different classification results are associated with different probabilities. Such probabilities can be obtained from an appropriate classification algorithm, e.g., depending on the relative occurrence were activation strength of certain features that are associated with a given classification result. |
| III | Labeling | A third task can include determining a label set of multiple labels for the anatomical substructures. For instance, such labels could be provided as textual description attached to the respective section of the tree-type segmentation that is associated with a given anatomical substructure. |

Hereinafter, details will be specifically described with respect to the task of determining a label set including multiple labels for anatomical substructures of a complex anatomical structure (cf. TAB. 1: task III). Techniques will be described that facilitate determining a label set for a complex anatomical structure that includes multiple substructures arranged in sequences. Techniques will be described that facilitate determining a label set using a tree-structured segmentation as input (cf. TAB. 1: example I), along with lists of candidate labels and associated probabilities that can be obtained, e.g., from respective classification of the anatomical substructures (cf. TAB. 1: example II) associated with different sections of the tree-structured segmentation.

In other words, it is assumed that, based on other postprocessing tasks of the medical imaging dataset, a segmentation of the anatomical structure is available that includes multiple sections associated with different anatomical substructures. The particular algorithms used to provide such segmentation is not germane for the functioning of the techniques described herein. For instance, reference techniques may be used, e.g., see Kong, Bin, et al. "Learning tree-structured representation for 3D coronary artery segmentation." Computerized Medical Imaging and Graphics 80 (2020): 101688 or Kerkeni, Asma, et al. "A coronary artery segmentation method based on multiscale analysis and region growing." Computerized Medical Imaging and Graphics 48 (2016): 49-61 for segmentation of the coronary artery.

Such segmentation, can, in particular, be structured in accordance with a tree-type data structure. I.e., a tree-structured segmentation of the anatomical structure can be obtained, the tree-structure segmentation included with multiple sequences of section that are associated with the sequences of substructures.

Figure 2:
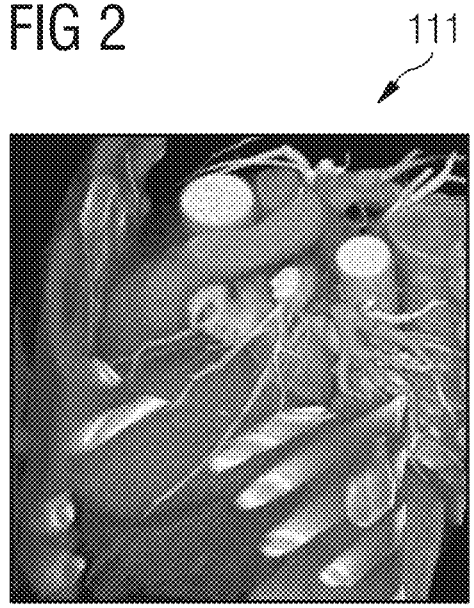
FIG. 2 is a medical imaging dataset, specifically, a CT scan of the heart.

For illustration, FIG. 2 illustrates a CT image of the heart. Using an appropriate postprocessing algorithm, it is possible to obtain a segmentation 121 of the coronary artery (cf. FIG. 3). Along with the segmentation 121, different sections 125 of the segmentation 121 are provided with a predetermined list 126 of candidate labels 127 and associated probabilities 128. Such list 126 can be obtain as a result of the classification algorithm, e.g., based on classification activation maps or other representation of probabilities of different classification results.

The sections 125 can be organized as nodes of a tree-type data structure (cf. FIG. 1).

Thus, along with the segmentation of the anatomical structure, further information is available regarding relative arrangement of the sections of the segmentation and associated probabilities of a classification result for the respective anatomical substructures of that anatomical structure. This classification result can serve as a list of candidate labels and associated probabilities.

Then, it is possible to determine a label set. The label set includes multiple labels for the anatomical substructures. This means that labels can be attached as textual description of semantic context information 2 different sections of the segmentation. The label set can be determined based on such additional information pertaining to the predetermined list of candidate labels and the associated probabilities.

Various techniques are based on the finding that—beyond the list of candidate labels and the associated probabilities, e.g., as obtained from a classification algorithm—oftentimes additional rules or constraints are available that limit the choice of a particular label for a given substructure/section of the segmentation.

Such ruleset can be seen as prior knowledge regarding possible variances of the anatomical structure. The ruleset can define anatomical relationships, i.e., what combinations of anatomical substructures are potentially possible. For instance, such ruleset can be provided based on expert knowledge. To give some examples, such ruleset can exclude certain combinations of substructures to be in direct neighborhood. Such ruleset could specify allowed combinations of substructures to be in direct neighborhood. Such ruleset can thus be used to determine which labels for a given section of the tree-type segmentation are generally allowed or not allowed, e.g., depending on the choice of one or more labels of neighboring sections of the tree-type segmentation. To give an example: Such ruleset may include the possible labels for a parent node of the tree-type segmentation given that a certain label has been assigned to a child node of that parent node. Similarly, such ruleset could specify the allowed labels for a child node, given that the parent node has been assigned a given label. Such ruleset could specify the allowed labels for a node given that one or more sibling nodes have been assigned with labels.

As a general rule, such ruleset of anatomical relationships can be expressed in various data structures. An example data structure implementing such ruleset 151 of anatomical interrelationships is shown in FIG. 4.

Figure 4:
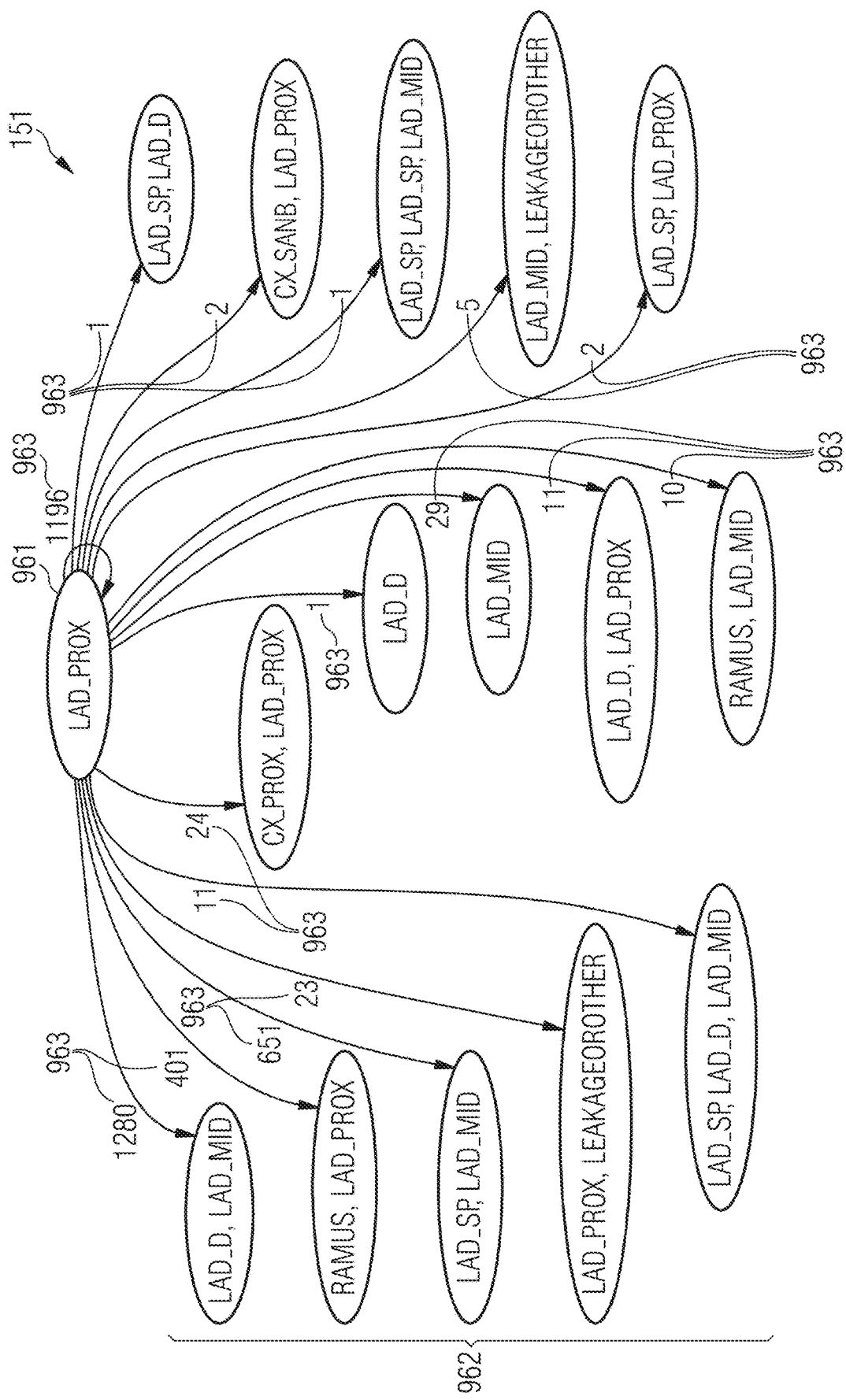
FIG. 4 schematically illustrates a rule set defining allowable labels according to various examples.

FIG. 4 illustrates aspects with respect to a ruleset 151 of anatomical interrelationships. The ruleset 151 is structured to enable determining of valid child labels given the tree-structured segmentation and a label of a section of the tree-structured segmentation represented by a respective parent node. The ruleset 151 can be used to determine, for each "parent label" of a parent node for a tree-structure segmentation, one or more allowed "child labels" for one or more child nodes of the parent node.

As illustrated in FIG. 4, given a certain label 961 of a parent node (i.e., for a respective section of the tree-type segmentation represented by that parent node), the valid labels 962 of the one or more child nodes are provided, e.g., in form of a list.

Figure 3:
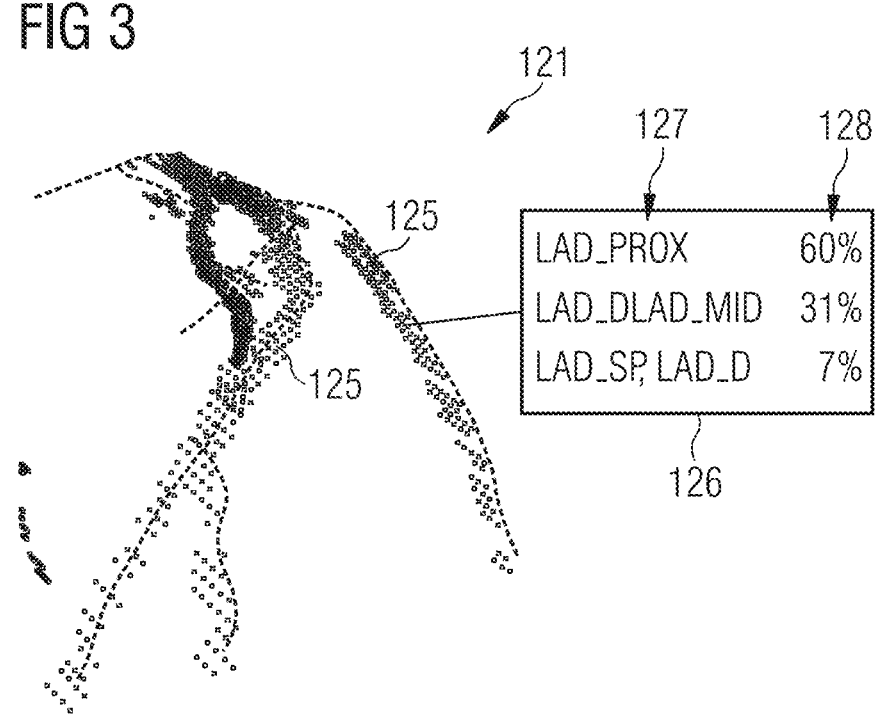
FIG. 3 schematically illustrates a tree-structured segmentation of the coronary artery for the medical imaging data set according to FIG. 2, wherein FIG. 3 also illustrates lists of candidate labels associated with different sections of the tree-structured segmentation and associated probabilities according to various examples.

Also, indications of respective likelihoods 963 are provided (these likelihoods 963 are generally distinct from the probabilities 128, cf. FIG. 3). These likelihoods 963 could be associated with respective rights of occurrence of the parent label—child labeled pair is expected based on prior knowledge.

Sometimes, the candidate child labels may depend on the count of child nodes that are associated with a parent node for which the label 961 is provided. In other words, different lists of candidate labels may be provided depending on the tree structure of the tree-structured segmentation.

Techniques for determining such ruleset 151 are not germane for the functioning of the techniques described herein. Accordingly, various options are conceivable for determining such ruleset 151. In one example, it would be possible to determine the ruleset 151 based on an annotation process used for obtaining ground truth labels for training a machine-learning algorithm that provides the classification of the segments of the segmentation (cf. TAB. 1: task II). For instance, respective manual annotations performed by an expert for parent node—child node pairs can be recorded and expressed in form of the ruleset 151. Respective occurrences can be counted, to thereby obtain the likelihoods 963. Also, the ruleset is generally explainable and can therefore be inspected and modified by experts.

Various techniques are based on the finding that the list of candidate labels (cf. FIG. 3: list 126 including the candidate labels 127 and the associated probabilities 128) for a given section of the tree-structured segmentation and sometimes differ from the list of allowed labels determined based on the ruleset for the same given section. For instance, some candidate labels may not be allowed by the ruleset while the ruleset may on the other hand allow certain labels that are not candidates.

Various techniques are disclosed that facilitate determining the label set considering such discrepancies between the list of candidate labels and constraints imposed by the ruleset.

According to various examples, it is possible to determine the label set taking into account such additional ruleset, beyond the tree-structured segmentation and the lists of candidate labels and associated probabilities obtained for the various sections of the tree-structured segmentation. I.e., the label assignment can be constrained by the ruleset, thereby taking into account additional prior knowledge.

Specifically, it is possible to perform a selection, for each segment of the tree-structured segmentation, from the respective predetermined list of candidate labels, to thereby determine the respective label for that segment. This selection can be based, both, on the associated probabilities, as well as taking into account the ruleset of anatomical interrelationships.

Thereby, it is possible to optimize the label said with respect to, both, the predetermined ruleset, as well as the list of candidate labels and the associated probabilities associated with the tree-structured segmentation. The overall quality of the label set can thereby be improved; erroneous labels may be avoided.

As a general rule, various options are available for performing the selection for each segment of the tree-structured segmentation. Specifically, a selection algorithm can be used that iteratively performs, for each segment of the tree-structured segmentation, a respective selection. I.e., a "walk-through" through the tree-type segmentation, "visiting" each section of the tree-type segmentation can be implemented.

For instance, such selection algorithm could operate recursively. Thus, a recursive walkthrough the tree-structured segmentation would be possible. Such an implementation of the segmentation algorithm is explained below in connection with FIG. 5.

Figure 5:
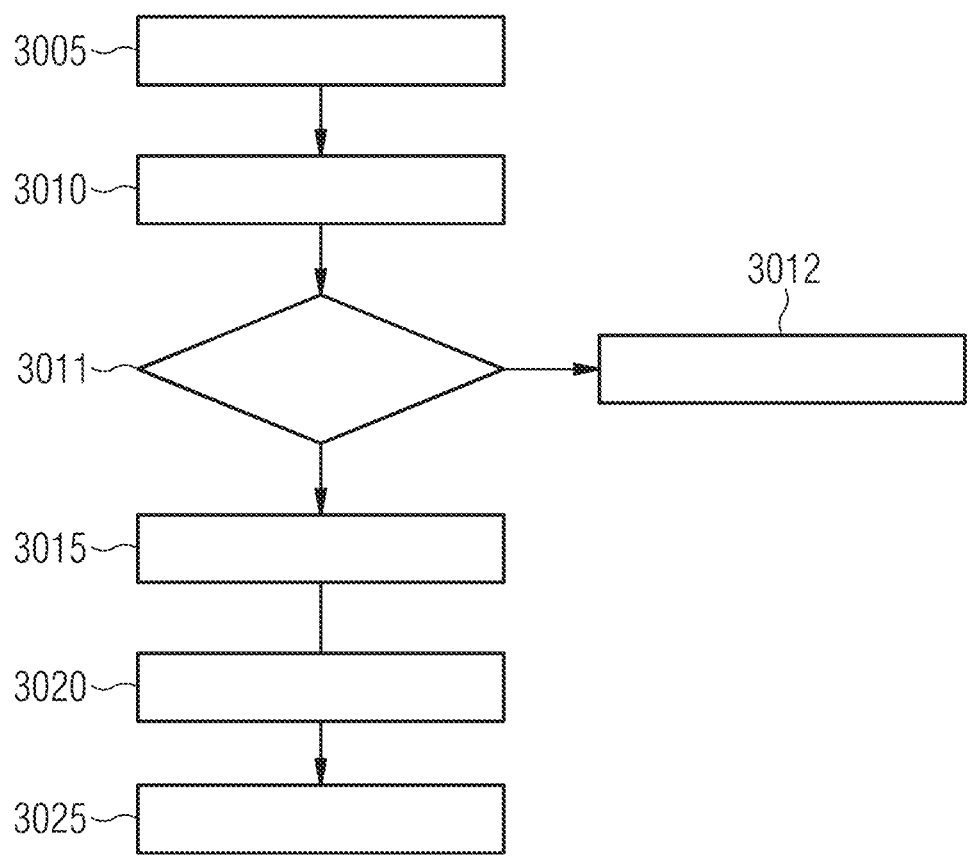
FIG. 5 is a flowchart of a method for implementing a recursive walk-through through a tree-type data structures such as the tree-structured segmentation according to various examples.

FIG. 5 is a flowchart of a method according to various examples. FIG. 5 illustrates aspects with respect to a recursion loop implemented by a selection algorithm.

At box 3005, a (previously determined, i.e., at a higher recursion layer) label of a parent node of the tree-structured segmentation is obtained.

At box 3010, based on the ruleset, all allowed labels for the currently considered node can be determined. The ruleset can specify multiple allowed labels as being valid for this label given the label of the parent node (cf. FIG. 4). For instance, only such valid labels may be considered that are also candidate labels.

Then, at box 3015, from this list of allowed labels, all permutations can be generated, resulting in a list of possible assignments of the labels to the child nodes.

To be able to take into account the predetermined probabilities associated with the various child nodes of the tree-structured segmentation, this list of allowed labels can be sorted by descending probability, at box 3020 (cf. FIG. 3: probabilities 128).

Sorting can be performed such that the allowed label for the currently considered node having maximum probability is put at the beginning of the list.

Additional sorting criteria can influence the sorting at box 3030 such as how often a certain rule was seen in the training set etc., i.e., the likelihoods 963.

A label for a child node can then be picked at box 3025. This picking can be done by indexing the sorted list of valid labels, and picking the list entry using a certain offset index. The offset index that can be specific to each section of the tree-structured segmentation.

More generally, a picking rule could be considered at box 3025. The picking rule can specify which label is picked to propagate to lower recursions.

For instance, if the offset is "0", the label having the highest probability can be used (at the top of the list).

Thus, the using different offsets result in different candidate solutions for the respective label set at the observed one or more child nodes.

Given one or more candidate solutions, the algorithm can recurse until all sections have labels or the algorithm fails.

Failure happens if the list of valid labels has zero length, i.e., when it is not possible to find a solution compatible with the ruleset; this would be checked at box 3011 of the recursion and failure would be passed backed to the higher recursion at box 3012.

Multiple possible solutions can be sampled by trying multiple sets of offsets and then choosing the solution with the maximum global label likelihood given the label probabilities for each section. In other words, it would be possible that the recursive walkthrough visits at least some sections of the tree-structured segmentation multiple times to determine multiple alternative solutions for the label set. One of these alternative solutions—associated with different picks from the list of valid labels provided by the ruleset—can be selected to eventually determine the label set based on the sums of the probabilities associated with the labels that are chosen for each one of the alternative solutions.

The picking rules for picking offsets/i.e., picking multiple possible solutions and trying out the result by propagating to further recursions is described next. Offsets might be picked randomly (i.e., the picking rule could include a random contribution) or according to a specific schedule. Given that the underlying probabilities are of good quality, one may assume that offset value "0" is oftentimes the best solution. Therefore, a useful schedule would for example test all zero offset and all one-hot offsets, i.e. all offsets zero except for one section where one might test "1", "2" or "3". This means, more generally, that the picking rule can take into account interrelationships between picks at different sections of the tree-type segmentation. Further samples might be two hot and three hot offsets. In a variant of the picking rule, evidence such as geometric features (bifurcation angle, distance to root/parent or main branch, curvature, etc.) or certain landmarks (e.g., left main bifurcation) can be incorporated in addition to the probabilities.

In some examples, it may not be required to a priori pick multiple offsets, i.e., try, a priori, multiple alternative solutions for a given label; rather, it would be possible to visit sections of the tree-structured segmentation multiple times only upon finding no valid solution for the label set based on the ruleset, i.e., if a failure is reported from another recursion.

Note that the above-described implementation of testing multiple alternative solutions for the label set in accordance with picking different offsets is only one of various possible options. As a general rule, it would be possible that the recursive walkthrough through the tree-structured segmentation visits at least some sections of the tree-structured segmentation multiple times in an ordered fashion, wherein such order is in accordance with the probabilities associated with the allowed labels.

Figure 6:
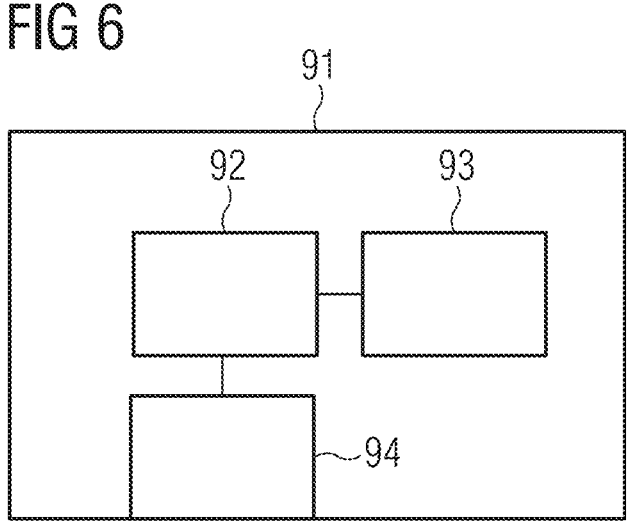
FIG. 6 schematically illustrates a processing device according to various examples.

FIG. 6 illustrates aspects with respect to a processing device 91. The processing device 91 includes a processor 92 and a memory 93. The processor 92 can load program code from the memory 93 and execute the program code. The processor 92 can communicate with remote entities via an interface 94. For instance, the processor 92 could receive, via the interface 94, medical imaging datasets, segmentations, and/or rulesets. The processor 92 could output, via the interface 94, a label set. The processor 92, upon loading and executing the program code, could perform techniques as described herein, e.g.: Determining a label set; selecting, for each section of a tree-structured segmentation, a respective label from a plurality of candidate labels and taking into account a predetermined ruleset; executing a respective selection algorithm.

Figure 7:
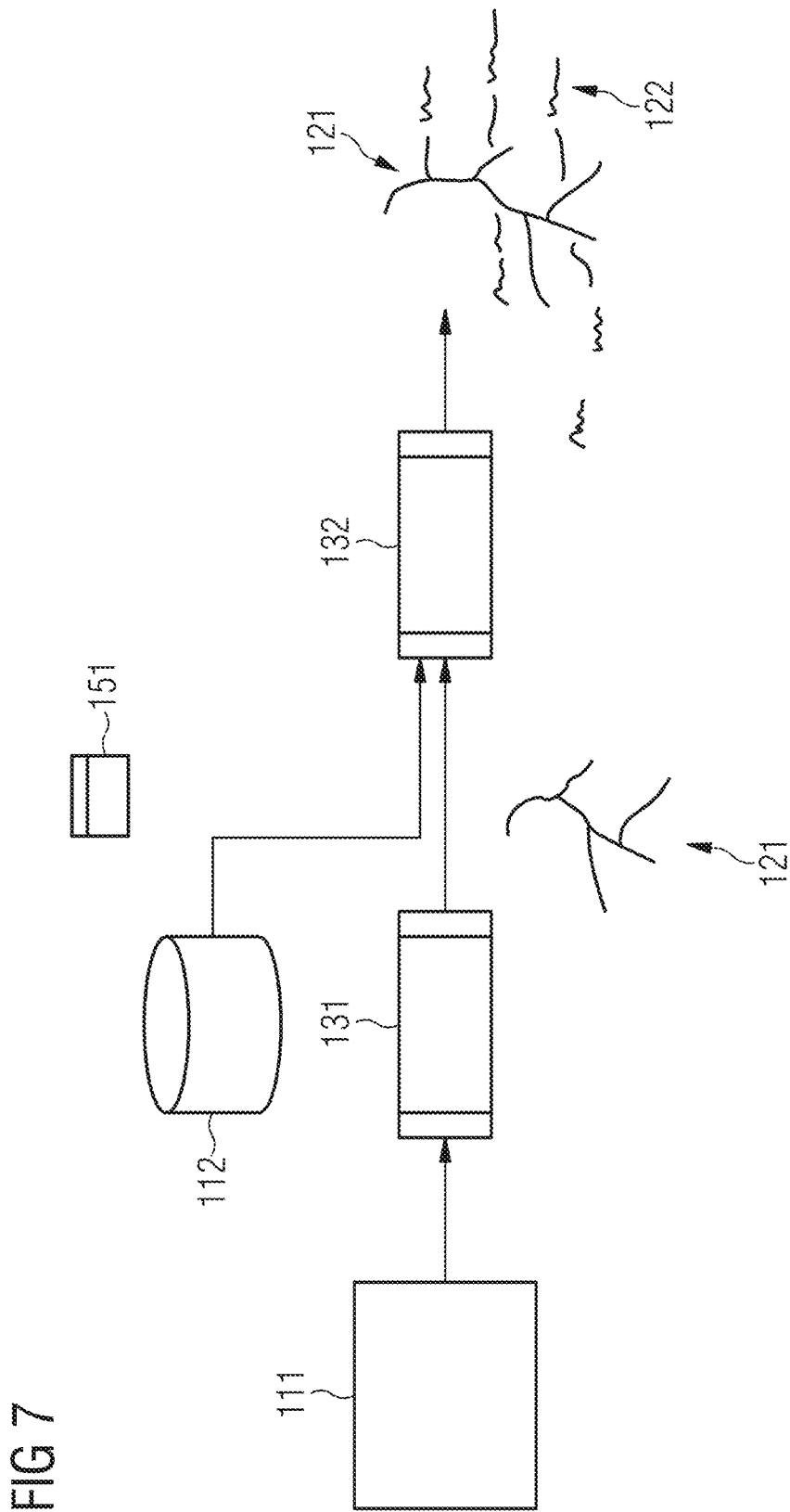
FIG. 7 schematically illustrates a data processing pipeline for post processing medical imaging datasets according to various examples.

An example processing pipeline of data processing that could be implemented by the processor 92 is illustrated in FIG. 7.

FIG. 7 is schematically illustrating aspects with respect to a processing pipeline for postprocessing of a medical imaging dataset 111. The medical imaging dataset 111 can be processed by a segmentation algorithm 131 to obtain a segmentation 121. The segmentation 121 includes multiple sections 125 and each section 125 is associated with a respective list of candidate labels and associated probabilities. This has been explained in connection with FIG. 3.

For instance, the segmentation algorithm 131 could be a trained algorithm, e.g., a machine-learning algorithm. A convolutional neural network may be used.

A further algorithm 132 is used to determine a label set 122, for the tree-type segmentation 121. The further algorithm 132 also takes into account the predetermined ruleset 151 which may be loaded from, e.g., a database 112. The ruleset 151 defines one or more valid labels for a given "child section" of the tree-type segmentation 121, given a previously determined label for a "parent section".

The algorithm 132 can, specifically, implement a recursive walkthrough through the sections of the tree-type segmentation 121. A respective recursion has been discussed in connection with FIG. 5 above.

Figure 8:
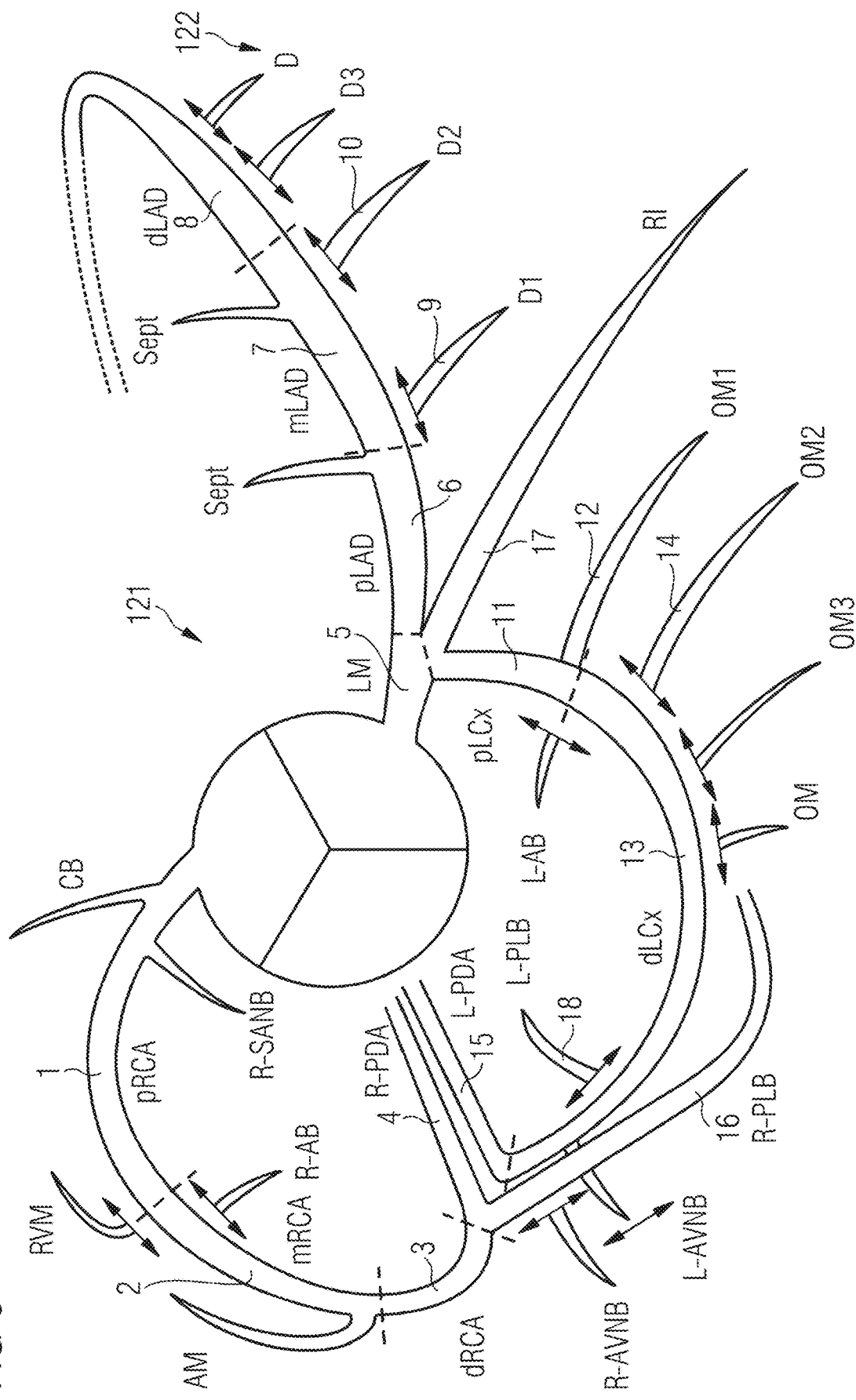
FIG. 8 schematically illustrates a label set overlaid on a medical imaging dataset.

The label set 122 that is obtained by such techniques could take the form as illustrated in FIG. 8.

FIG. 8 schematically illustrates the label set 122 where textual description of various sections of the coronary artery are shown next to the coronary artery. Multiple anatomical substructures 1-18, i.e., sections of the coronary artery, are shown.

FIG. 9 is a flowchart of a method according to various examples. The method of FIG. 9 could be executed by a processing device, e.g., the processing device 91 according to FIG. 6. The method of FIG. 9 could be executed by a processor such as the processor 92, upon loading and executing program code from a memory such as the memory 93. The flowchart of FIG. 9 could implement the processing pipeline of FIG. 7.

At box 3105, it would be possible to obtain a tree-structured segmentation of an anatomical structure. This can include executing a respective segmentation algorithm (cf. FIG. 7: segmentation algorithm 131). In other scenarios, it would be possible that the tree-structure segmentation has been preprepared and, at box 3105, is loaded from a database. For instance, the tree-structure segmentation could be loaded from a picture archiving system, e.g., together with the underlying medical imaging data set.

The tree-structured segmentation includes multiple sections arranged in sequences, i.e., next to each other forming a chain; the sequences correspond to branches of the underlying tree-type data structure. Each sequence can include at least one section. The sequences are also associated with sequences of substructures of the anatomical structure.

At box 3110, along with the tree-structured segmentation, for each section of the tree-structured segmentation (implementing nodes of a tree-type data structure), a respective list of candidate labels can be obtained along with associated probabilities.

At box 3115, a ruleset of anatomical interrelationships between substructures of the respective anatomical structure can be obtained.

Thus, the ruleset can define one or more valid labels for a given anatomical substructure, depending on the assumption of another assigned label to another anatomical substructure. Thus, meaningless or unrealistic or artificial combinations of labels of adjacent substructures are avoided.

At box 3120, it is then possible to determine the label set, taking into account the trees-structured segmentation of box 3105, the list of candidate labels for the sections of the tree-structured segmentation as obtained in box 3110, as well as the ruleset as obtained in box 3115. For instance, for each section, a respective selection of a label can be made, e.g., using a recursive algorithm such as the one as explained in connection with FIG. 5.

Summarizing, a data-driven approach for postprocessing medical imaging data sets has been disclosed.

A ruleset of allowable combinations of labels for adjacent substructures of an anatomical structure can be generated from an annotation process for annotating a training set used for training of a segmentation algorithm that segments that anatomical structure. A ruleset can be manually generated. The rules it can be explainable and can be edited.

A data structure for such a ruleset has been disclosed which enables a recursive construction of multiple solutions for a labeling set taking into account the ruleset.

An efficient walkthrough scheme has been disclosed, for implementing the recursive algorithm to make a selection of a label for each section of a tree-structured segmentation.

Sampling can be efficiently implemented using offsets and schedules.

This enables an efficient way to find high-likelihood and consistent solutions.

Empirical testing for labeling of a coronary artery showed a significant improvement of the accuracy. The main classify security for a coronary artery labeling problem with 29 labels went from 77% to 86%.

Although the present invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various techniques have been disclosed in the context of labeling complex anatomical structures that include multiple sequences of substructures and bifurcations. Specifically, examples have been disclosed for labeling the coronary artery. As a general rule, similar techniques could also be employed for other blood vessels or even for other fields of postprocessing of imaging datasets, e.g., in the field of surveillance or analyzing satellite/aerial images.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code.

Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A computer-implemented method of determining a label set, the label set including multiple labels for anatomical substructures of an anatomical structure depicted by a medical imaging dataset, the anatomical substructures being arranged in multiple sequences joined at bifurcation points, and the computer-implemented method comprising:
   obtaining a tree-structured segmentation of the anatomical structure in the medical imaging dataset, the tree-structured segmentation including multiple sequences of sections associated with the multiple sequences of the anatomical substructures;
   obtaining a respective list of candidate labels and associated probabilities for each of the sections;
   obtaining a ruleset of anatomical interrelationships between the anatomical substructures; and
   determining the label set by performing a selection for each of the sections from the respective list of candidate labels of a respective label based on the associated probabilities and the ruleset, the performing includes performing the selection based on a recursive walkthrough through the tree-structured segmentation.

2. The computer-implemented method of claim 1, wherein the recursive walkthrough visits at least some of the sections multiple times to determine multiple alternative solutions for the label set.

3. The computer-implemented method of claim 2, wherein the determining the label set includes selecting one of the multiple alternative solutions based on sums of probabilities associated with labels of each of the multiple alternative solutions.

4. The computer-implemented method of claim 2, wherein
the multiple alternative solutions for a first section correspond to different picks from the respective list of candidate labels of the first section, the first section being among the at least some of the sections; and
a sequence of the different picks is based on one or more picking rules.

5. The computer-implemented method of claim 4, wherein the one or more picking rules include a random contribution.

6. The computer-implemented method of claim 4, wherein the one or more picking rules are based on at least one geometric feature of the first section.

7. The computer-implemented method of claim 4, wherein the one or more picking rules are based on interrelationships between different sections among the sections.

8. The computer-implemented method of claim 1, wherein the recursive walkthrough visits at least some of the sections multiple times based on no valid solution being found for the label set based on the ruleset.

9. The computer-implemented method of claim 1, wherein the ruleset defines, for each parent label of a parent node of the tree-structured segmentation, one or more allowed labels for one or more child nodes of the parent node.

10. The computer-implemented method of claim 9, wherein the ruleset defines the one or more allowed labels based on a count of the one or more child nodes.

11. The computer-implemented method of claim 9, wherein the ruleset defines a respective likelihood for each one of the one or more allowed labels.

12. The computer-implemented method of claim 9, wherein
the recursive walkthrough visits at least some of the sections multiple times to determine multiple alternative solutions for the label set; and
each of the multiple alternative solutions is associated with a different allowed label among the one or more allowed labels.

13. The computer-implemented method of claim 12, wherein different visits to a first section are ordered based on probabilities associated with the one or more allowed labels.

14. The computer-implemented method of claim 1, further comprising:
processing the medical imaging dataset in a trained algorithm to determine lists of candidate labels and associated probabilities, the respective list of candidate labels and associated probabilities for each of the sections being among the lists of candidate labels and associated probabilities.

15. The computer-implemented method of claim 3, wherein
the multiple alternative solutions for a first section correspond to different picks from the respective list of candidate labels of the first section, the first section being among the at least some of the sections; and
a sequence of the different picks is based on one or more picking rules.

16. The computer-implemented method of claim 5, wherein the one or more picking rules are based on at least one geometric feature of the first section.

17. The computer-implemented method of claim 16, wherein the one or more picking rules are based on interrelationships between different sections among the sections.

18. A non-transitory computer-readable medium storing computer-executable instructions that, when executed by at least one processor, cause the at least one processor to perform a method of determining a label set, the label set including multiple labels for anatomical substructures of an anatomical structure depicted by a medical imaging dataset, the anatomical substructures being arranged in multiple sequences joined at bifurcation points, and the method comprising:
obtaining a tree-structured segmentation of the anatomical structure in the medical imaging dataset, the tree-structured segmentation including multiple sequences of sections associated with the multiple sequences of the anatomical substructures;
obtaining a respective list of candidate labels and associated probabilities for each of the sections;
obtaining a ruleset of anatomical interrelationships between the anatomical substructures; and
determining the label set by performing a selection; for each of the sections from the respective list of candidate labels of a respective label based on the associated probabilities and the ruleset, the performing includes performing the selection based on a recursive walkthrough through the tree-structured segmentation.

19. The non-transitory computer-readable medium of claim 18,
wherein the recursive walkthrough visits at least some of the sections multiple times to determine multiple alternative solutions for the label set.

20. A device for determining a label set, the label set including multiple labels for anatomical substructures of an anatomical structure depicted by a medical imaging dataset, the anatomical substructures being arranged in multiple sequences joined at bifurcation points, and the device comprising:
a memory storing computer-executable instructions; and
at least one processor configured to execute the computer-executable instructions to cause the device to
obtain a tree-structured segmentation of the anatomical structure in the medical imaging dataset, the tree-structured segmentation including multiple sequences of sections associated with the multiple sequences of the anatomical substructures,
obtain a respective list of candidate labels and associated probabilities for each of the sections,
obtain a ruleset of anatomical interrelationships between the anatomical substructures, and
determine the label set by performing a selection, for each of the sections from the respective list of candidate labels of a respective label based on the associated probabilities and the ruleset, the selection being performed based on a recursive walkthrough through the tree-structured segmentation.

* * * * *